Patented Sept. 19, 1939

2,173,482

UNITED STATES PATENT OFFICE 2,173,482

PROCESS FOR THE POLYMERIZATION OF UNSATURATED HYDROCARBONS

Emil Keunecke, Oppau, and Wilhelm Muench, Ludwigshafen-on-the-Rhine, Germany, assignors to I. G. Farbenindustrie Aktiengesellschaft, Frankfort-on-the-Main, Germany No Drawing. Application April 24, 1937, Serial No. 138,748. In Germany April 25, 1936

6 Claims. (Cl. 260—683)

The present invention relates to the production of valuable liquid hydrocarbons, in particular such as boil within the boiling point range of benzines, by polymerization of unsaturated hydrocarbons, especially olefines of low molecular weight, and more particularly such as are gaseous at ordinary temperatures, such as ethylene, propylene and butylenes.

It has already been proposed to polymerize the said olefines in the presence of catalysts of the nature of aluminum chloride, boron fluoride, phosphoric acids and the like, under ordinary or superatmospheric pressures and at a temperature which is dependent on the activity of the catalyst is more or less elevated or as low as room temperature. Inert solvents may also be present during the said conversion. However, some inconveniences are often encountered with the said catalysts. Thus in many cases difficultly decomposable double compounds of the catalysts with the olefines to be polymerized are formed which have no or only an insufficient catalytic activity, or undesired high molecular resinous compounds are formed, or the polymerization cannot be carried on continuously and in an industrially simple and economical manner, or the activity of the catalysts becomes soon reduced or exhausted by the deposition of carbon or substances rich in carbon whereupon only small or no yields of the desired products are obtained.

We have now found that these inconveniences are avoided and that the polymerization of gaseous or also low molecular liquid olefines, such as butylenes or propylene, amylenes, cyclohexene, or also of diolefines, such as butadiene, isoprene and the like proceeds in a very advantageous manner if it is carried out in the presence of substances which are known to catalytically promote the said polymerization and applying them to active wood charcoal having, at a grain size of from 2 to 4 millimeters, a filling weight of at the most 20 grams per 100 cubic centimeters of filling volume. As catalytically active substances applied to the said active wood charcoals are especially suitable the oxygen-containing acids of phosphorus, such as orthophosphoric acid, pyrophosphoric acid and metaphosphoric acid; but also other substances come into consideration, such as boric acid, perchloric acid and other acids, hydrofluoboric acid, boron fluoride dihydrate, compounds of boron fluoride with alcohols, phenols or organic acids, glycerophosphoric acids, aluminum chloride, tin tetrachloride, titanium tetrachloride and the like, or substances furnishing the said compounds under the operation conditions, or also the anhydrides of difficultly reducible acids, such as phosphorus pentoxide, boric anhydride or the salts of the said acids, or mixtures of any of the said catalytic substances. With these substances deposited on the said active wood charcoals the polymerization of the olefines proceeds already under ordinary pressure, but better yields are obtained, especially when starting from ethylene, if the process is carried out at elevated pressures, preferably ranging from 2 to 20 or even more atmospheres. The polymerization products formed are very valuable liquid hydrocarbon mixtures or contain these in considerable amounts. They represent excellent motor fuels in view of their high octane numbers and are capable of considerably increasing the stability of other motor fuels to knocking when added thereto. The conversion is usually effected at temperatures between 40 and 300° C., preferably between 100 and 250° C. Even after working for some weeks no exhaustion of the said catalysts can be observed and still less a clogging up of the apparatus.

We have found that among the large number of carriers which are available for applying thereto polymerization catalysts the said active wood charcoals furnish by far better yields of the desired products than other carriers. These active wood charcoals are also considerably superior to other carbons, such as active carbons from coal or peat. Preferably active wood charcoals having a filling weight as small as possible, for example of only 15 grams or still less per 100 cubic centimeters of filling volume, are employed. Especially suitable are those active wood charcoals which contain no inorganic constituents, such as ashes, or a very small amount thereof. Such charcoal may be obtained by washing with a volatile acid, such as hydrochloric acid, and subsequently with water, or by effecting the activation with agents which are not partly adsorbed—not even in small amounts—by the charcoal, as is the case for example with zinc chloride. It is therefore desirable to carry out the activation with gaseous or vaporous agents, such as steam or combustion gases. It has been found that in particular the yields per unit of weight and time (expressed for example in grams of polymerization product per hour and per kilogram of charcoal) and the working life of the catalysts are dependent on the manner of preparing the charcoals. There is also a dependency of these factors on the nature of the wood employed for the preparation of the charcoal. The said active charcoals having a low filling weight give considerably better results than do other active carbons, even than those which, as for example the active carbons suitable for use in gas masks, have a very good capacity for absorbing gases. They are also by far superior to other porous carriers, such as kieselguhr, Florida earth, bleaching earths, silica gel, active clays and the like, since they give several times the yield of the desired polymerization products obtained when employing under otherwise the same conditions the said substances as carriers impregnated with equal amounts of the same catalysts. A similar superiority exists over liquid phosphoric acid.

Depending on the temperature, the pressure, the velocity of flow of the treated unsaturated hydrocarbons, the nature of the catalytic substance added to the active wood charcoal (for example whether the catalytic substance is phosphoric acid alone or with an addition of silver phosphate or copper phosphate), the composition and the boiling point range of the polymerization products obtained is different. The higher the temperatures and velocities of flow the higher the yield of low molecular polymerized hydrocarbons boiling below 200° C. The products which are in most cases colorless or slightly yellowish and do not become dark in color, represent, after separation into suitable fractions, either very valuable benzines for motor cars (the octane number being above 87) or, after subsequent hydrogenation, valuable aviation benzines. They may also be added with good results to other benzines since even in amounts of from 10 to 25 per cent to lower grade benzines, as for example benzine having an octane number below 50 or 60, they may increase this value by up to 20 units.

Depending upon the particular temperature and pressure employed, on the activity of the catalyst and the nature of the desired products the initial unsaturated hydrocarbons may be subjected for different periods to the polymerizing treatment. Thus, when treating propylene under normal pressure a duration between about 0.5 and 12 minutes, preferably between 1.5 and 6 minutes will suffice; when working under a pressure of 9 atmospheres already a duration of about 10 seconds is sufficient for a 98 per cent conversion. With higher molecular olefines, such as butylenes, anylenes and the like, the time of treatment is somewhat shorter, while with ethylene it is longer.

The advantages obtained by the process according to the present invention over the known operations, in particular as regards the yield per space and time, the stability of the catalysts and the simplicity of the manner of producing the latter will also result from the following examples further illustrating this invention, but the invention is not restricted to these particular examples.

Example 1

16.3 grams of an active wood charcoal having a small grain size, a low ash content and a filling weight of 16.3 grams per 100 cubic centimeters of filling volume have added thereto 24.7 grams of a 100 per cent phosphoric acid. Thereupon propylene (of 99 per cent purity) is passed under ordinary pressure and at a temperature of 180° C. through 100 cubic centimeters of a space filled with the catalyst so obtained at a velocity of flow of 20 cubic centimeters per hour and per cubic centimeter of catalyst. In one throughput 70.5 per cent by weight of the propylene are thus converted with a yield of 97.4 grams of polymerization product per hour and per kilogram of phosphoric acid or of 130.3 grams of polymerization product per hour and per kilogram of carrier. Even after working for more than 40 days no clogging up of the apparatus can be observed. When reducing the velocity of flow to 10 cubic centimeters per hour and per cubic centimeter of catalyst spaced even 77.8 per cent by weight of the propylene supplied may be converted at 220° C.

The resulting polymerization product is a mixture of different hydrocarbons. In most cases it has a lower boiling limit of between about 40 and 60° C. and an upper boiling limit between 230 and about 260° C. The 50 per cent point (i. e. the temperature at which half the product has distilled over) varies between 80 and 180° C.

When subjecting under the above-described conditions butylenes instead of propylene to the same conversion polymerization products boiling between 40 and about 400° C. are obtained, the 50 per cent point being at about 300° C. At a velocity of flow which is thrice or four times as high, the final products have an end boiling point of between about 200 and 340° C.

At a temperature of 220° C. and a velocity of flow of 30 cubic centimeters per hour and per cubic centimeter of catalyst space a liquid polymerization product is obtained in a yield of 171.5 grams per hour and per kilogram of carrier. In the following table are indicated the yields of polymerization products obtained under otherwise the same conditions with active carbons not produced from wood charcoal.

| Active carbon not produced from wood charcoal and having the following filling weight in grams per 100 ccm. of filling volume | Yield of polymerization product in grams per hour and per kilogram of carrier |
| --- | --- |
| 39.6 | 27.5 |
| 48.1 | 21.7 |
| 65.7 | 16.6 |
| 37.7 | 15.9 |
| 40.8 | 0.6 |

With silica gel having large pores and a filling weight of 41.0 grams per 100 cubic centimeters of filling volume the respective yield in grams is 7.3.

To the said carriers the same amount of phosphoric acid per 100 cubic centimeters of catalyst space was added as to the aforementioned active wood charcoal.

From the above table it follows that the yields obtained with the light active wood charcoals give several times the yield obtained with the other active carriers.

Example 2

When adding 32 grams of phosphoric acid per 100 cubic centimeters of catalyst space to the active wood charcoal employed according to the preceding example propylene passed thereover at 220° C. under ordinary pressure and at a velocity of flow of 30 cubic centimeters per hour and per cubic centimeter of catalyst space is converted in one throughput in an amount of 68 per cent by weight. Per hour and per kilogram of phosphoric acid 110.3 grams of polymerization product are formed; per hour and per kilogram of carrier the yield of polymerization product amounts to 217 grams.

Example 3

Through three reaction chambers arranged in series, filled with a catalyst employed according to Example 2, having a total volume of 8.69 liters (the volumes of the first two chambers being each 3.75 liters and that of the third chamber 1.19 liters) and being maintained at a temperature of about 180° C. and under ordinary pressure, propylene is passed at a velocity of flow of 112 liters per hour (corresponding to 30 cubic centimeters per hour and per cubic centimeter of catalyst space). In this manner 98 per cent of the propylene are converted and the yields of polymerization product obtained amount to 122.5 grams on an average per hour and per kilogram of catalyst in the first chamber, 111.1 grams in the second chamber and 82.3 grams in the third chamber. Even after working for 2 weeks no reduction in the activity of the catalyst (which may be determined by a contingent reduction of the yield per unit of time) may be observed.

Example 4

When passing propylene at 180° C., under a propylene partial pressure of 5 atmospheres and at a velocity of flow of 171 cubic centimeters per hour and per cubic centimeter of catalyst space over the catalyst employed according to Example 2, 95 per cent of the propylene are converted and polymerization products are obtained in a yield of 722 grams per hour and per kilogram of phosphoric acid or of 660 grams per hour and per kilogram of the entire catalyst (phosphoric acid together with the carrier).

When the treatment is carried out under a propylene partial pressure of 9 atmospheres, and with a velocity of flow of 340 cubic centimeters (reckoned on ordinary pressure) per hour and per cubic centimeter of catalyst space, 98 per cent of the propylene are converted and the yield of polymerization products obtained amounts to 1239 grams per hour and per kilogram of phosphoric acid or to 1173 cubic centimeters per hour and per kilogram of the entire catalyst.

Example 5

A more than 99 per cent isobutylene is passed at 220° C., under ordinary pressure and at a velocity of flow of 30 cubic centimeters per hour and per cubic centimeter of catalyst space over the catalyst employed according to Example 2. In one throughput a practically complete conversion of the isobutylene takes place and the yield of polymerization product amounts to 131.6 grams per hour and per kilogram of the entire catalyst.

If isobutylene is passed under the same conditions of temperature and pressure but at a velocity of flow of 60 cubic centimeters per hour and per cubic centimeter of catalyst space over the catalyst employed according to Example 2 the isobutylene is also practically completely converted in one throughput and the yield of polymerization product amounts to 267 grams per hour and per kilogram of the entire catalyst. Even after about 3 weeks' operation no reduction in the activity of the catalyst can be observed.

Example 6

A 99 per cent propylene is passed at 200° C., under ordinary pressure and at a velocity of flow of 30 cubic centimeters per hour and per cubic centimeter of catalyst space over a catalyst obtained by adding 38.3 grams of an 89 per cent phosphoric acid to 12.1 grams of an alderwood charcoal activated by steam, having a grain size of between 2 and 4 millimeters and a filling weight of 12.1 grams per 100 cubic centimeters of filling volume. In this manner 67.6 per cent by weight of the propylene are converted and the yield of polymerization product amounts to 102.9 grams per hour and per kilogram of 100 per cent phosphoric acid or to 291 grams per hour and per kilogram of carrier.

When working under the same conditions but with a carrier consisting of pinewood charcoal activated in the same manner as the aforesaid alderwood charcoal and having the same grain size as the latter, but a filling weight of 9.8 grams per 100 cubic centimeters of filling volume, 59.3 per cent by weight of the propylene supplied are converted and the yield of polymerization products amounts to 90.3 grams per hour and per kilogram of 100 per cent phosphoric acid and to 315 grams of polymerization product per hour and per kilogram of carrier. An active charcoal prepared in the same manner from lindenwood and having a filling weight of 11.3 grams per 100 cubic centimeters of filling volume furnishes under the same working conditions a 57.8 per cent conversion of the propylene supplied, the yield of polymerization products being 87.9 grams per hour and per kilogram of 100 per cent phosphoric acid and 266 grams per hour and per kilogram of carrier.

Example 7

The following table shows the results of further experiments in which olefines are passed at 16 atmospheres over active carbons impregnated with phosphoric acid. The phosphoric acid is present in an amount of 17.7 grams (with reference to a 100 per cent acid) per 100 cubic centimeters of catalyst space. The active carbon referred to as $T_4$-carbon is a very common commercial active carbon having a filling weight above 20 grams per 100 cubic centimeters of filling volume and which is prepared by activating peat with zinc chloride.

| Nature of active carbon | Filling weight in grams per 100 ccm. of filling volume | Nature of treated gas | Temperature in °C. | Conversion rate in per cent | Yield of polymerization product | | | |
|---|---|---|---|---|---|---|---|---|
| | | | | | G/hour per liter of catalyst | G/hour per kg. of catalyst | G/hour per kg. of phosphoric acid | G/hour per kg. of active carbon |
| Carbon according to Example 1 | 15.5 | Propylene | 200 | 63.2 | 898 | 2,580 | 5,073 | 5,793 |
| Active lindenwood charcoal | 11.3 | do | 200 | 55.5 | 647 | 2,232 | 3,658 | 5,730 |
| Active pinewood charcoal | 9.8 | do | 200 | 57.3 | 697 | 2,536 | 3,941 | 7,117 |
| Active alderwood charcoal | 12.1 | do | 200 | 66.9 | 1,056 | 3,544 | 5,967 | 8,729 |
| $T_4$-carbon | 37.0 | do | 200 | 33.8 | 266 | 487 | 1,504 | 720 |
| Carbon according to Example 1 | 15.5 | Isobutylene | 100 | 98.4 | 4,233 | 12,164 | 23,915 | 27,310 |
| $T_4$-carbon | 37.0 | do | 100 | 92.3 | 821 | 1,507 | 4,638 | 2,219 |

This table shows the advantages resulting from the use of active wood charcoals having a low filling weight as compared with heavier carbons.

The increase of the yield by the use of higher pressures will be seen from the fact that when the first of the experiments indicated in this table is carried out with the active wood charcoal employed according to Example 1 under the same conditions but at ordinary pressure the conversion of propylene amounts to 47.2 per cent by weight, the yield of polymerization product being 25 grams per hour and per liter of catalyst, 71 grams per hour and per kilogram of catalyst, 139 grams per hour and per kilogram of phosphoric acid and 144 grams per hour and per kilogram of active wood charcoal.

What we claim is:

1. A process for the production of valuable liquid hydrocarbons by polymerization of low molecular unsaturated hydrocarbons which comprises contacting such unsaturated hydrocarbon with a catalyst comprising a substance catalytically promoting the polymerization of unsaturated hydrocarbons which is applied to an activated wood charcoal having, at a grain size of from 2 to 4 millimeters, a filling weight of at the most 20 grams per 100 cubic centimeters of filling volume.

2. A process for the production of valuable liquid hydrocarbons in which a gaseous olefine is polymerized by contact with a catalyst as defined in claim 1.

3. A process according to claim 1 in which a gaseous olefine is contacted with a catalyst comprising an oxygen-containing acid of phosphorus applied to an activated wood charcoal having, at a grain size of from 2 to 4 millimeters, a filling weight of at the most 20 grams per 100 cubic centimeters of filling volume.

4. A process as claimed in claim 1 in which a gaseous olefine is contacted with a catalyst comprising a substance catalytically promoting the polymerization of gaseous olefines which is applied to an active wood charcoal having, at a grain size of from 2 to 4 millimeters, a filling weight of less than 15 grams per 100 cubic centimeters of filling volume.

5. In the process as claimed in claim 1 employing an active wood charcoal which prior to the addition of the catalytically active substance is substantially free from inorganic constituents.

6. A process as claimed in claim 1 which comprises employing an active wood charcoal which for the removal of ashes has been treated with a volatile acid and subsequently been activated by a hot gaseous or vaporous activating agent.

EMIL KEUNECKE.
WILHELM MUENCH.